United States Patent
Krause et al.

(10) Patent No.: US 12,163,570 B2
(45) Date of Patent: Dec. 10, 2024

(54) HYDRAULIC BUMP STOP ASSEMBLY

(71) Applicant: Jason Krause, Glendale, AZ (US)

(72) Inventors: Jason Krause, Glendale, AZ (US); Justin Smith, Wittmann, AZ (US)

(73) Assignee: Jason Krause, Glendale, AZ (US)

( * ) Notice: Subject to any disclaimer, the term of this patent is extended or adjusted under 35 U.S.C. 154(b) by 0 days.

(21) Appl. No.: 18/487,639

(22) Filed: Oct. 16, 2023

(65) Prior Publication Data
US 2024/0035540 A1 Feb. 1, 2024

Related U.S. Application Data

(62) Division of application No. 18/053,067, filed on Nov. 7, 2022, now Pat. No. 11,788,600, which is a division of application No. 17/230,439, filed on Apr. 14, 2021, now Pat. No. 11,493,106.

(60) Provisional application No. 63/009,857, filed on Apr. 14, 2020.

(51) Int. Cl.
*F16F 9/49* (2006.01)
*F16F 9/16* (2006.01)

(52) U.S. Cl.
CPC . *F16F 9/49* (2013.01); *F16F 9/16* (2013.01)

(58) Field of Classification Search
CPC .................. F16F 9/16; F16F 9/49; F16F 9/58
See application file for complete search history.

(56) References Cited

U.S. PATENT DOCUMENTS

| | | | |
|---|---|---|---|
| 3,036,669 A * | 5/1962 | Schultze | F16F 9/49 188/289 |
| 3,647,239 A * | 3/1972 | Katsumori | F16F 9/063 188/269 |
| 5,678,808 A | 10/1997 | Claude et al. | |
| 6,389,341 B1 | 5/2002 | Davis | |
| 6,776,402 B2 | 8/2004 | Miyamoto et al. | |
| 7,681,897 B2 | 3/2010 | Beck | |
| 8,262,100 B2 * | 9/2012 | Thomas | B60G 17/021 280/5.514 |
| 8,317,172 B2 * | 11/2012 | Quinn | B60G 17/06 267/64.15 |
| 9,656,529 B2 | 5/2017 | Bartolozzi et al. | |
| 11,867,254 B2 * | 1/2024 | Sankaran | F16F 9/585 |
| 2006/0027954 A1 | 2/2006 | Nesbitt et al. | |
| 2007/0200311 A1 | 8/2007 | Beck | |
| 2008/0179148 A1 * | 7/2008 | Quinn | F16F 13/06 188/322.13 |

(Continued)

*Primary Examiner* — Thomas W Irvin
(74) *Attorney, Agent, or Firm* — Schmeiser, Olsen & Watts LLP

(57) ABSTRACT

Embodiments of a hydraulic bump stop assembly may include a telescoping hydraulic cylinder containing hydraulic fluid. The telescoping cylinder may be located on a vehicle shock. Components of the shock may engage and compress the telescoping cylinder during the final stages of compression of the shock to prevent the shock from bottoming out. The telescoping cylinder has damping properties during compression and expansion due to hydraulic fluid being forced through orifices of one or more hydraulic fluid lines to and from a reservoir. Damping ratios may be adjusted by adjusting the size of the orifices. In some embodiments, the damping ratios may be adjusted remotely, such as from the driver compartment of the vehicle.

3 Claims, 17 Drawing Sheets

(56) References Cited

U.S. PATENT DOCUMENTS

| | | | |
|---|---|---|---|
| 2012/0074660 A1* | 3/2012 | Thomas | B60G 17/021 |
| | | | 280/5.514 |
| 2015/0367697 A1 | 12/2015 | Bartolozzi et al. | |
| 2018/0355944 A1* | 12/2018 | Veltum | F16F 9/185 |
| 2019/0203798 A1 | 7/2019 | Cox et al. | |
| 2020/0011395 A1* | 1/2020 | Sankaran | F16F 9/49 |
| 2021/0123495 A1* | 4/2021 | Sankaran | F16F 9/585 |
| 2023/0279921 A1* | 9/2023 | Sarapata | F16F 9/185 |
| | | | 188/322.14 |

* cited by examiner

HYDRAULIC BUMP STOP ASSEMBLY

CROSS REFERENCE TO RELATED APPLICATION[S]

This application is a divisional of U.S. Patent Application entitled "HYDRAULIC BUMP STOP ASSEMBLY," Ser. No. 18/053,067, filed Nov. 7, 2022, which is a divisional of U.S. Patent Application entitled "HYDRAULIC BUMP STOP ASSEMBLY," Ser. No. 17/230,439, filed Apr. 14, 2021, now U.S. Pat. No. 11,493,106, issued Nov. 8, 2022, which claims priority to U.S. Provisional Patent Application entitled: "HYDRAULIC BUMP STOP ASSEMBLY," Ser. No. 63/009,857, filed Apr. 14, 2020, the disclosures of which are hereby incorporated entirely herein by reference.

TECHNICAL FIELD

This invention relates generally to vehicle suspension systems and particularly to a hydraulic bump stop assembly configured to be coupled to a shock of a vehicle.

BACKGROUND

When a vehicle is driven over bumps or rough terrain, the suspension system may bottom out. Bottoming out may include a shock absorber being compressed to the fullest extent. Bottoming out of a shock may cause damage to the shock and/or to other vehicle components, in addition to causing an uncomfortable, or even dangerous, ride for passengers.

To prevent bottoming out, some conventional shock absorbers have integrated bump stops that serve as a suspension cushion to keep shock parts from coming together or from traveling too far. These are typically made of rubber or urethane, or other similar material for absorbing shock, and are formed with a through hole for coupling around the shaft of the shock. They are sized appropriately to be engaged during only the last portion of travel of the shock during the final stages of compression. Some are "stepped" to provide incremental damping and spring ratios as they are compressed. A disadvantage of a conventional rubber or urethane bump stop is that it dissipates energy into the suspension rebound, causing stress on the shock. These bump stops offer little damping and often behave much like a pure coil spring.

An alternative that has become popular in recent years is a gas pressurized nitrogen bump stop (often called an air bumps or hydraulic bump stop). These cylindrical units consist of a short stroke shock mechanism that is velocity sensitive. Oil is used inside and moves through orifices much like a standard shock. This allows the bump to effectively dampen, or slow, the suspension movement through its final inches of travel. In contrast with an air or gas shock, they have large shaft diameters and are much shorter. Hydraulic bump stops also exhibit some rebound dampening as well. Conventional hydraulic bump stops are not integrated components of a shock. They are typically mounted separately to the vehicle suspension system and operate independently from the shock absorbers of the vehicle. This takes up additional space on the vehicle, requires additional labor and significant cost for materials and labor. In addition, many vehicle racing organization rules prohibit these hydraulic bump stops separate from the shocks.

SUMMARY OF THE INVENTION

The present invention relates to vehicle suspension systems and particularly to a hydraulic bump stop assembly configured to be coupled to a shock of a vehicle. Some embodiments may comprise a shock with a hydraulic bump stop coupled thereto. In one embodiment, a hydraulic bump stop comprises an outer hydraulic cylinder and an inner hydraulic cylinder operationally coupled to, and coaxial with, the outer hydraulic cylinder. The inner cylinder slidingly engages the outer cylinder, and the outer hydraulic cylinder and the inner hydraulic cylinder define a telescoping cylinder interior volume. The hydraulic bump stop further comprises a fluid reservoir, in fluid communication with the telescoping cylinder interior volume through at least one orifices.

Embodiments of a hydraulic bump stop assembly may comprise a telescoping hydraulic cylinder comprising an outer hydraulic cylinder and an inner hydraulic cylinder operationally coupled to, and coaxial with, the outer hydraulic cylinder, wherein the inner cylinder slidingly engages the outer cylinder in a telescoping fashion. Each of the inner and outer cylinders has an inner volume for containing hydraulic fluid, wherein the combined inner volume may expand or contract with extension or contraction of telescoping cylinder, respectively, by sliding of the inner cylinder, in a telescoping fashion, in or out, relative to the outer cylinder. In some embodiments, without limitation, a telescoping hydraulic cylinder may comprise additional concentric telescoping members. The telescoping cylinder may comprise a seal coupled between each of the adjoining telescoping members.

In some embodiments, the telescoping cylinder may be configured to be coupled to a shock of a vehicle. Some embodiments comprise a vehicle with a shock having a telescoping hydraulic cylinder coupled thereto.

The telescoping cylinder has a damping effect during compression and expansion. The telescoping cylinder may be configured to be coupled to a shock of a vehicle, such that components of the shock engage the telescoping cylinder during final stages of compression of the shock to prevent the shock from bottoming out. During compression and expansion of the telescoping cylinder, hydraulic fluid is expelled from or drawn into the telescoping cylinder, respectively, through at least one orifice between the telescoping cylinder and at least one hydraulic fluid line for carrying hydraulic fluid between the telescoping cylinder and a reservoir. This gives the telescoping cylinder a damping effect both during compression and expansion.

Damping ratios may be adjustable or controllable by a user by changing the cross-sectional area of the at least one orifice. In some embodiments, the means of controlling adjustment of the damping ratio may be remote, such as from a control located within the driver compartment of the vehicle.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

As discussed above, embodiments of the present invention relate to vehicle suspension systems and particularly to a hydraulic bump stop assembly configured to be coupled to a shock of a vehicle. Some embodiments may comprise a shock with a hydraulic bump stop coupled thereto.

Figure 1A:
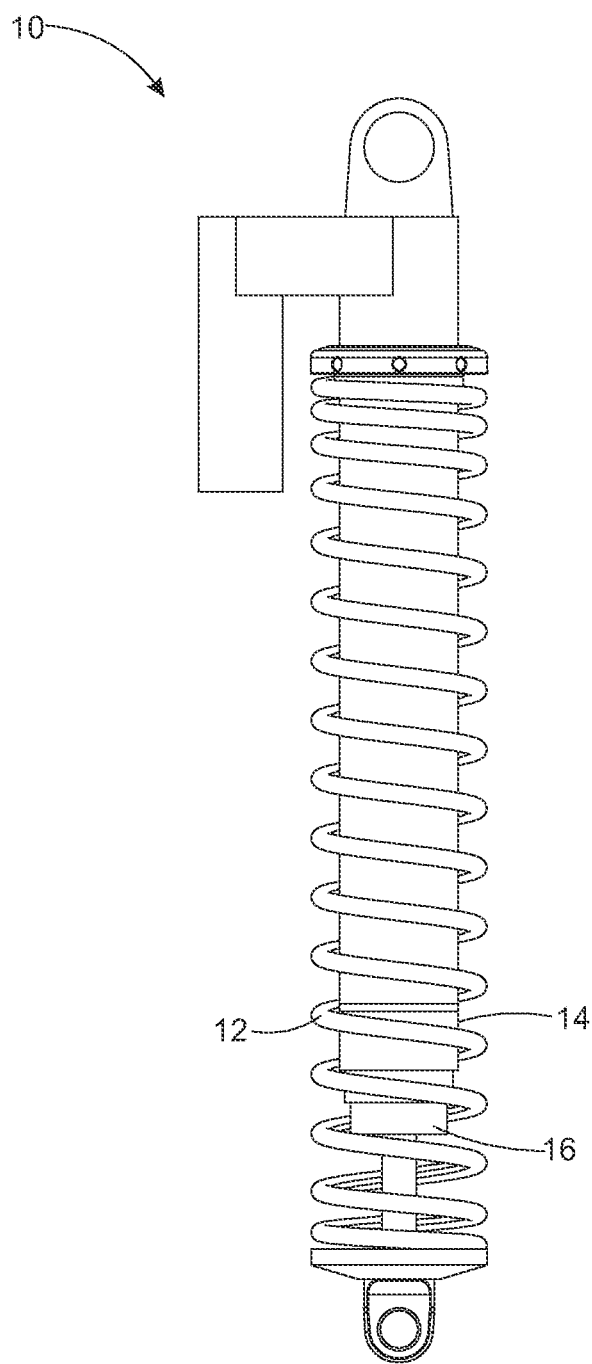
FIG. 1A is a front view of a shock absorber comprising a hydraulic bump stop assembly, according to an embodiment.
Figure 1B:
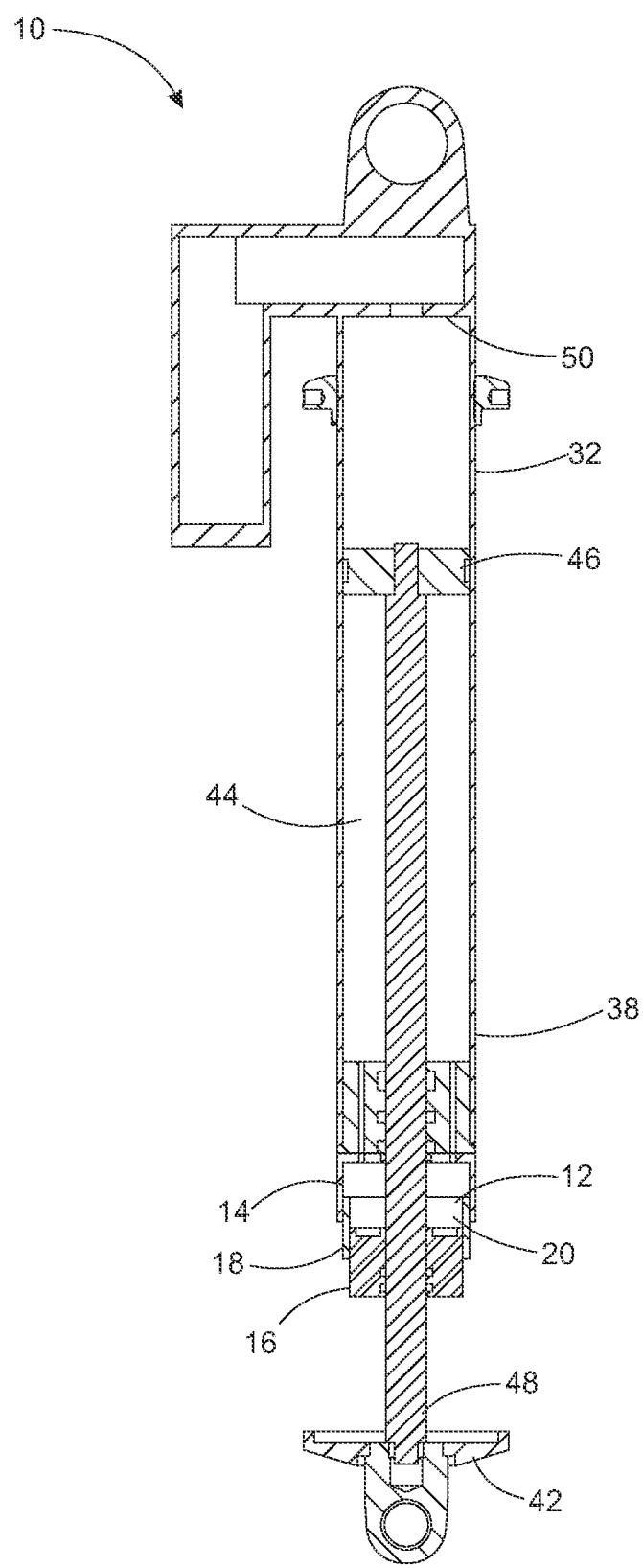
FIG. 1B is a front section view of a h shock absorber comprising a hydraulic bump stop assembly, according to an embodiment.
Figure 1C:
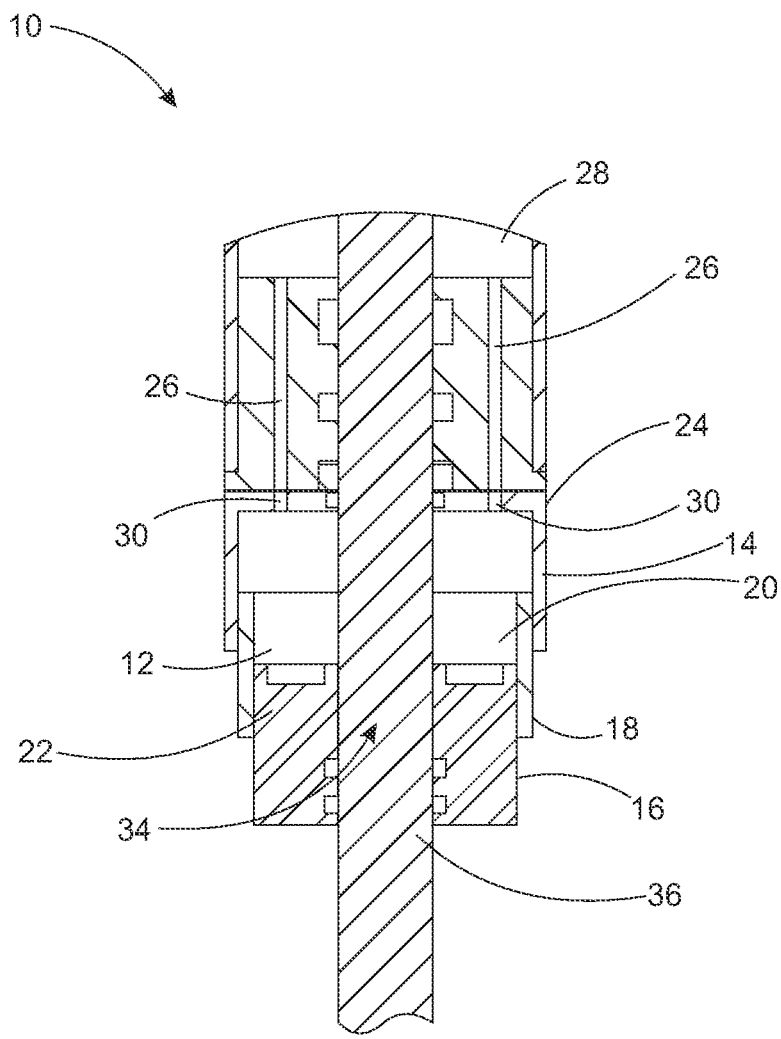
FIG. 1C is a close-up front section view of a hydraulic bump stop assembly, according to an embodiment.
Figure 1D:
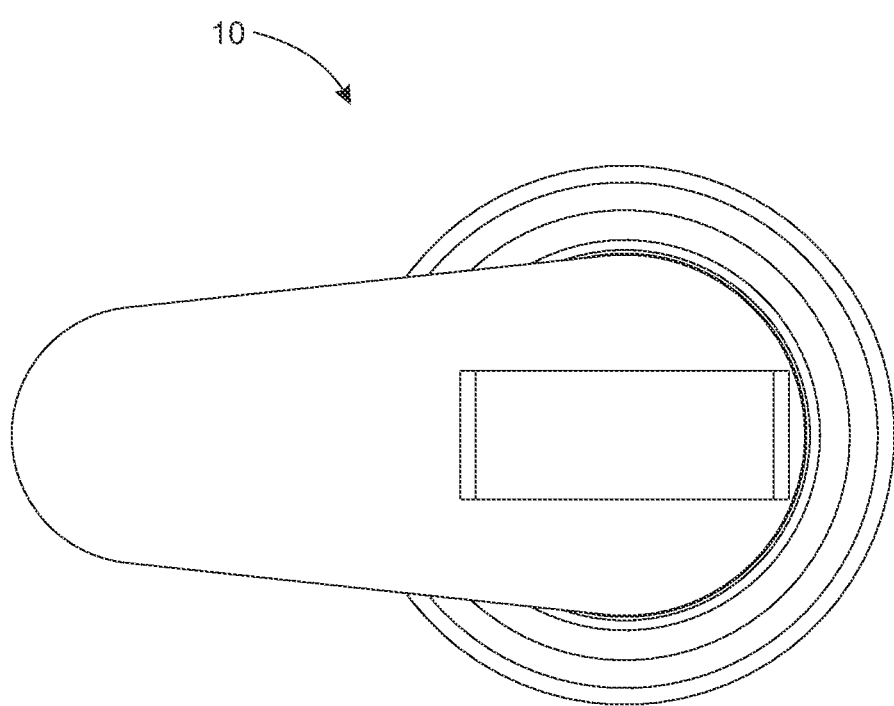
FIG. 1D is a top view of a hydraulic bump stop assembly, according to an embodiment.

FIG. 1A is a front view of a shock absorber 10 comprising a hydraulic bump stop assembly, according to an embodiment. Embodiments of a shock absorber 10 comprising a hydraulic bump stop assembly may comprise a telescoping hydraulic cylinder 12 comprising an outer hydraulic cylinder 14 and an inner hydraulic cylinder 16 operationally coupled to, and coaxial with, the outer hydraulic cylinder 14, wherein the inner cylinder 16 slidingly engages the outer cylinder 14 in a telescoping fashion. FIG. 1B is a front section view of shock absorber 10 comprising a hydraulic bump stop assembly, according to an embodiment. Each of the inner and outer cylinders 16 and 14 has an inner volume for containing hydraulic fluid 24, wherein the combined inner volume 20 may expand or contract with extension or contraction of telescoping cylinder 12, respectively, by sliding of the inner cylinder 16, in a telescoping fashion, in or out, relative to the outer cylinder 14. The telescoping cylinder 12 may comprise a seal 22 coupled between the inner and outer cylinders 16 and 14.

It is to be understood, for purposes of this application, that "hydraulic fluid" may refer to liquid hydraulic fluid, or to any other liquid or gas that may be suitable for use in any hydraulic or pneumatic piston cylinder.

The telescoping cylinder 12 may be coupled to and in fluid communication with at least one hydraulic fluid line 26 for carrying hydraulic fluid 24 between the telescoping cylinder 12, at one end of the at least one hydraulic fluid line 24, and a reservoir 28 coupled to and in fluid communication with the at least one hydraulic fluid 26 at the opposite end thereof. In some embodiments, the reservoir 28 may be an accumulator. When the telescoping hydraulic cylinder 12 is compressed, a portion of the hydraulic fluid 24 within the telescoping hydraulic cylinder 12 is expelled through the at least one hydraulic fluid line 26 and into the reservoir 28. Resistance of hydraulic fluid 24 being forced through at least one orifice 30 between the telescoping cylinder 12 and each of the at least one hydraulic fluid line 26 creates a damping effect when the hydraulic cylinder 12 is compressed, the damping ratio of which is determined by the cross-sectional area of the at least one orifice 30. In reverse, as the telescoping cylinder 12 is expanded, also known as "rebound," a rebound damping effect is also determined by the cross-sectional area of the at least one orifice 30 through which hydraulic fluid 24 returns into the telescoping cylinder 12.

In some embodiments, hydraulic fluid 24 may exit from and return to the telescoping cylinder 12 through the same orifice 30. In some embodiments, hydraulic fluid 24 may return to the telescoping cylinder 12 through a different orifice 30, having a different cross-sectional area from the cross-sectional area of the orifice 30 through which it was expelled. In such embodiments, the compression damping ratio may be different from the rebound damping ratio, wherein each of the compression damping ratio and the rebound damping ratio may be controlled independently based on the cross-sectional areas of the respective orifices 30. In some embodiments, the orifices 30 may be adjustable in cross sectional area, whether by a manual adjustment means, or by an automatic adjustment means, such as by an actuator, whether electronic or otherwise (not shown).

In some embodiments, without limitation, a telescoping hydraulic cylinder 12 may comprise additional concentric telescoping members 18. For example, a telescoping hydraulic cylinder 12 may comprise an outer cylinder 16, an inner cylinder 14, and at least one intermediate cylinder 18 operationally coupled between the outer cylinder 14 and the inner cylinder 16 in a telescoping fashion, with a seal 22 being coupled between each of the adjoining members. Greater lengths of travel, during compression and rebound, may thus be achieved by integration of additional telescoping cylinder members 18. In addition, use of additional cylinder members 18 creates a stepped damping ratio, as the damping ratio steps up during compression as each successive telescoping cylinder member is compressed and the next successive telescoping cylinder member is engaged, beginning with the inner cylinder 16, until the outer cylinder 14 is engaged. This is due to the increasingly larger cross-sectional area of each successively larger diameter cylinder, resulting in a greater volume rate of flow of hydraulic fluid 24 being forced through the at least one hydraulic fluid line 26. The reverse is true during rebound, wherein the damping ratio steps down with expansion of each successive telescoping member.

Embodiments of a telescoping hydraulic cylinder 12 of a hydraulic bump stop assembly 10 may be configured to be coupled to a shock 32 of a vehicle. For example, a telescoping hydraulic cylinder 12 may have a longitudinal central aperture 34 therethrough, through which a main rod 36 of a shock 32 may extend. In some embodiments, a telescoping hydraulic cylinder 12 may be coupled to the bottom end 38 of a hydraulic piston cylinder 40 of a shock 32, wherein the main rod 36 extends through the central aperture 34 of the telescoping hydraulic cylinder 12, the main rod 36 being able to slide through the central aperture 34 as the shock 32 is compressed and expanded. As the shock 32 is compressed, the main rod 36 slides through the central aperture 34 until the bottom perch 42 of the shock 32 engages the inner cylinder 16 of the telescoping hydraulic cylinder 12. The telescoping hydraulic cylinder 12 provides some resistance and a damping effect until the inner cylinder 16 is compressed and the next successive telescoping cylinder member is engaged by the bottom perch 42. Each successive telescoping cylinder member is engaged, in turn, and compressed, until the bottom perch 42 engages the outer cylinder 14, if at all. As described above, the damping ratio is increased as each successive telescoping cylinder 12 is engaged by the bottom perch 42.

In such embodiments, the reservoir 28 may be that portion of the interior volume 44 of the piston cylinder 40 of the shock 32 below the piston 46, wherein the at least one hydraulic fluid line 26 is in fluid communication with the interior volume 44 of the piston cylinder 40 of the shock 32 below the piston 46. In such embodiments, the interior volume 44 of the piston cylinder 40 of the shock 32 below the piston 46 increases as the shock 32 is compressed, tending to draw hydraulic fluid 24 from the telescoping cylinder 12. However, the rate of flow of hydraulic fluid 24 is relatively slow until such point as the bottom perch 42 engages the telescoping cylinder 12 and begins to compress the telescoping cylinder 12. As the shock 32 is extended during rebound, hydraulic fluid 24 is expelled from the piston cylinder 40 and back into the telescoping cylinder 12 to expand the telescoping cylinder 12 again. The rate of expansion of the telescoping cylinder 12 during rebound is controlled because of the damping effect due to the cross-sectional area of the at least one orifice 30.

Figure 2A:
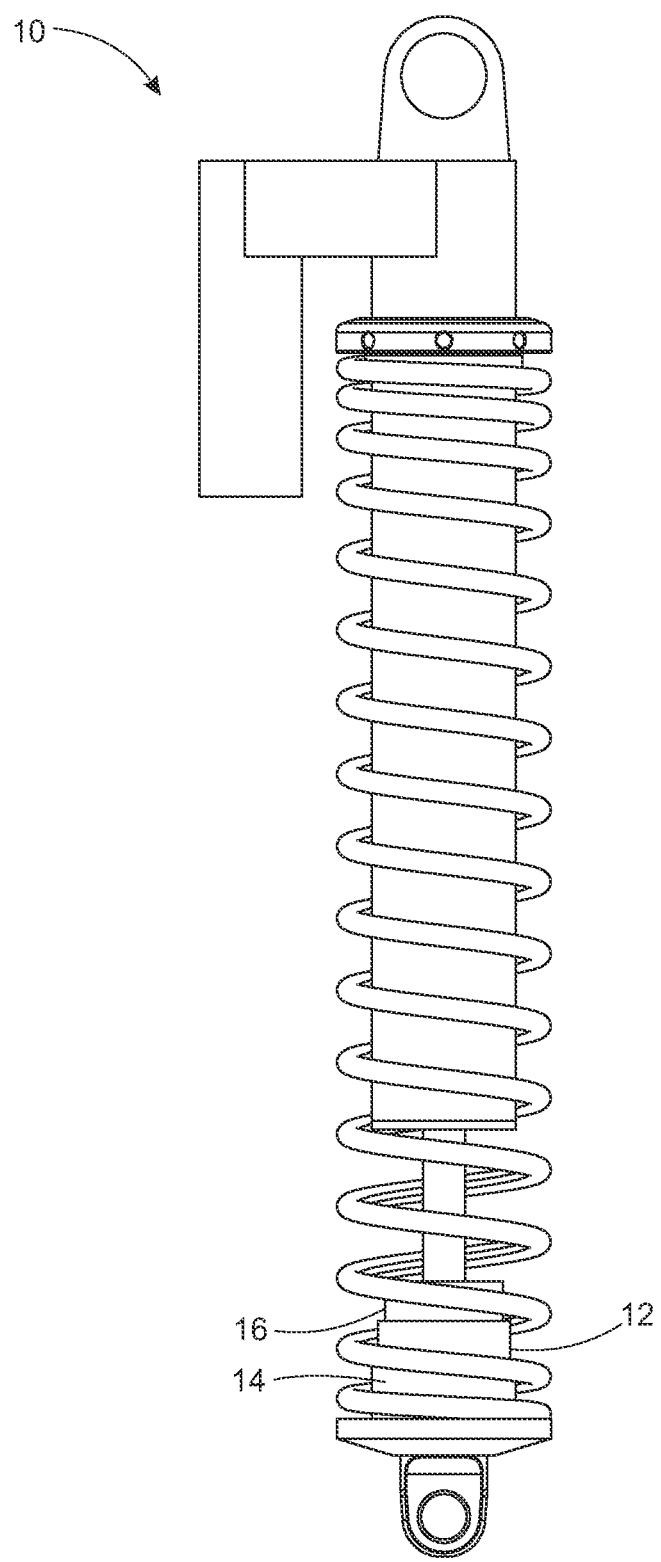
FIG. 2A is a front view of a shock absorber comprising a hydraulic bump stop assembly, according to an embodiment.
Figure 2B:
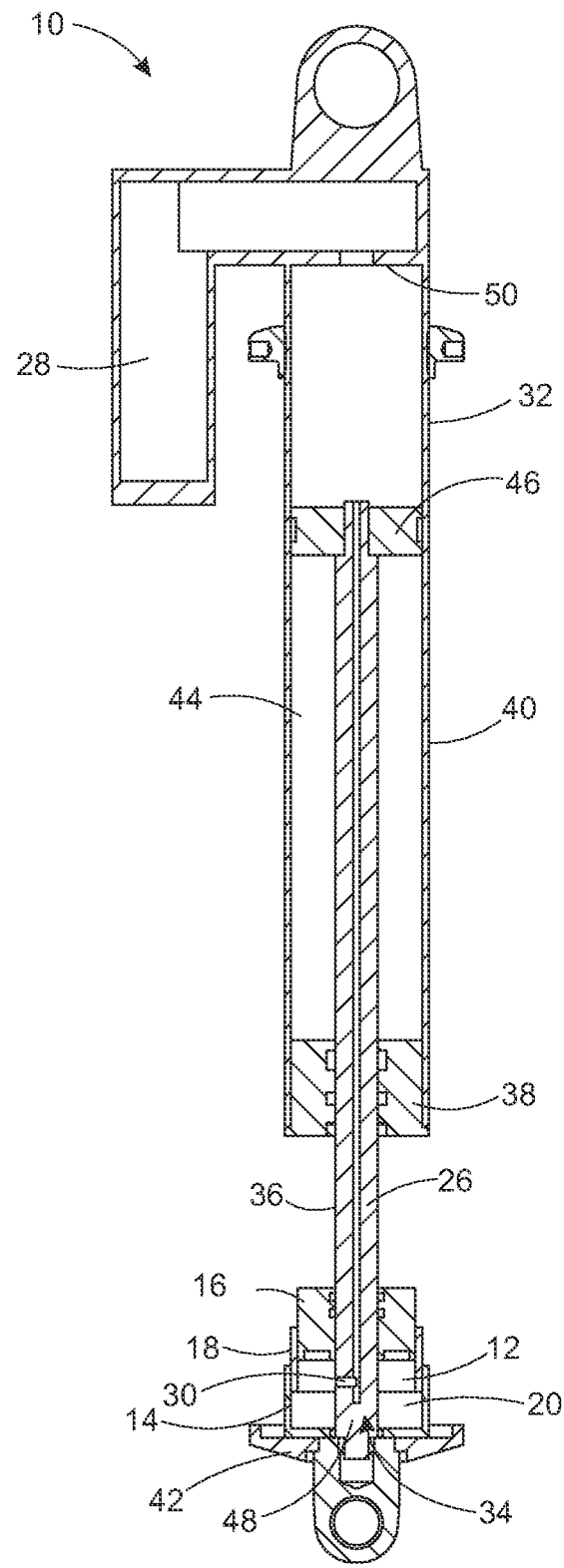
FIG. 2B is a front section view of a shock absorber comprising a hydraulic bump stop assembly, according to an embodiment.
Figure 2C:
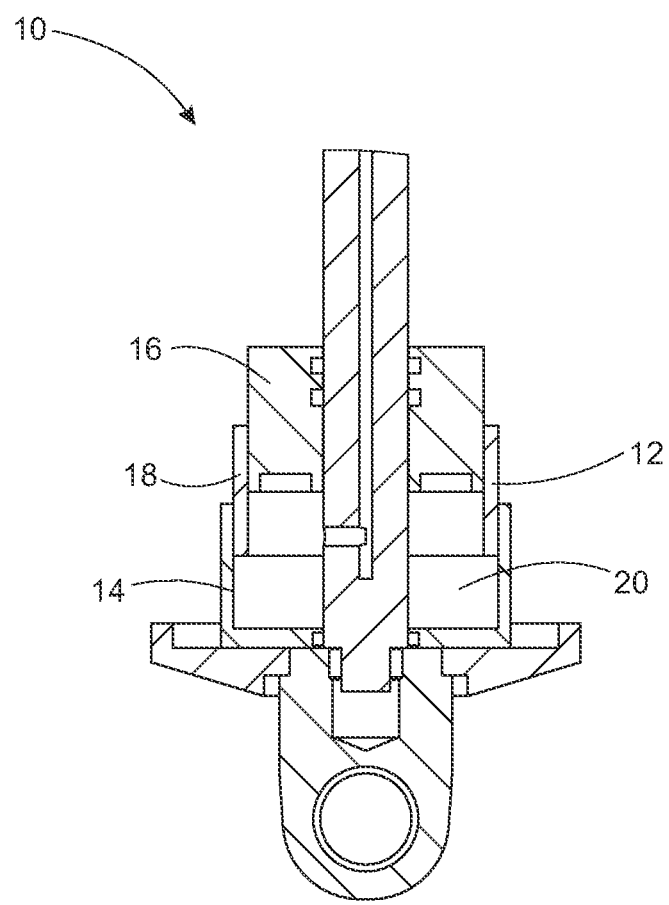
FIG. 2C is a close-up front section view of a hydraulic bump stop assembly, according to an embodiment.
Figure 2D:
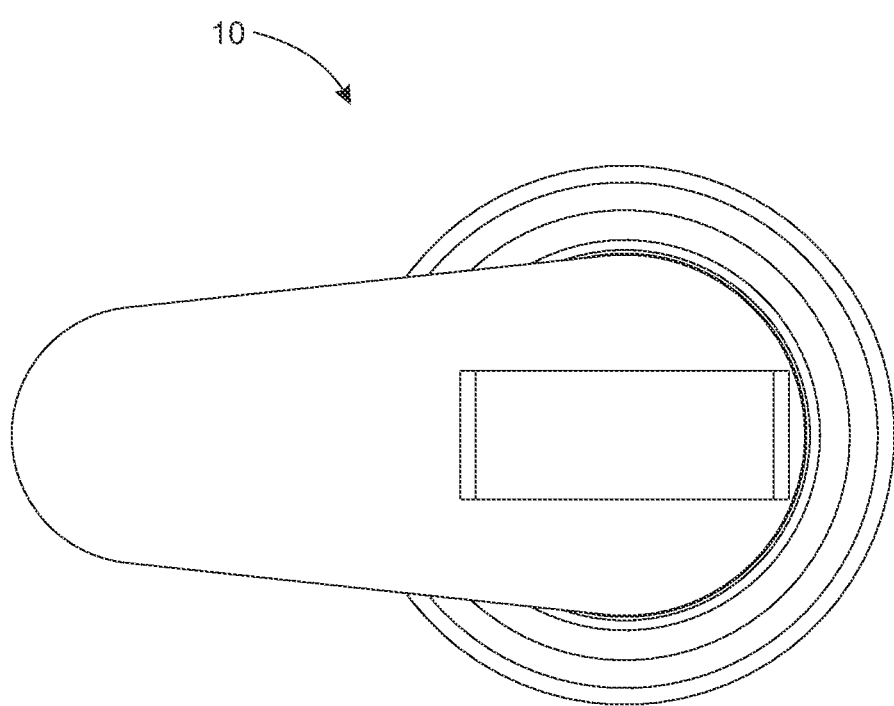
FIG. 2D is a top view of a hydraulic bump stop assembly, according to an embodiment.
Figure 3A:
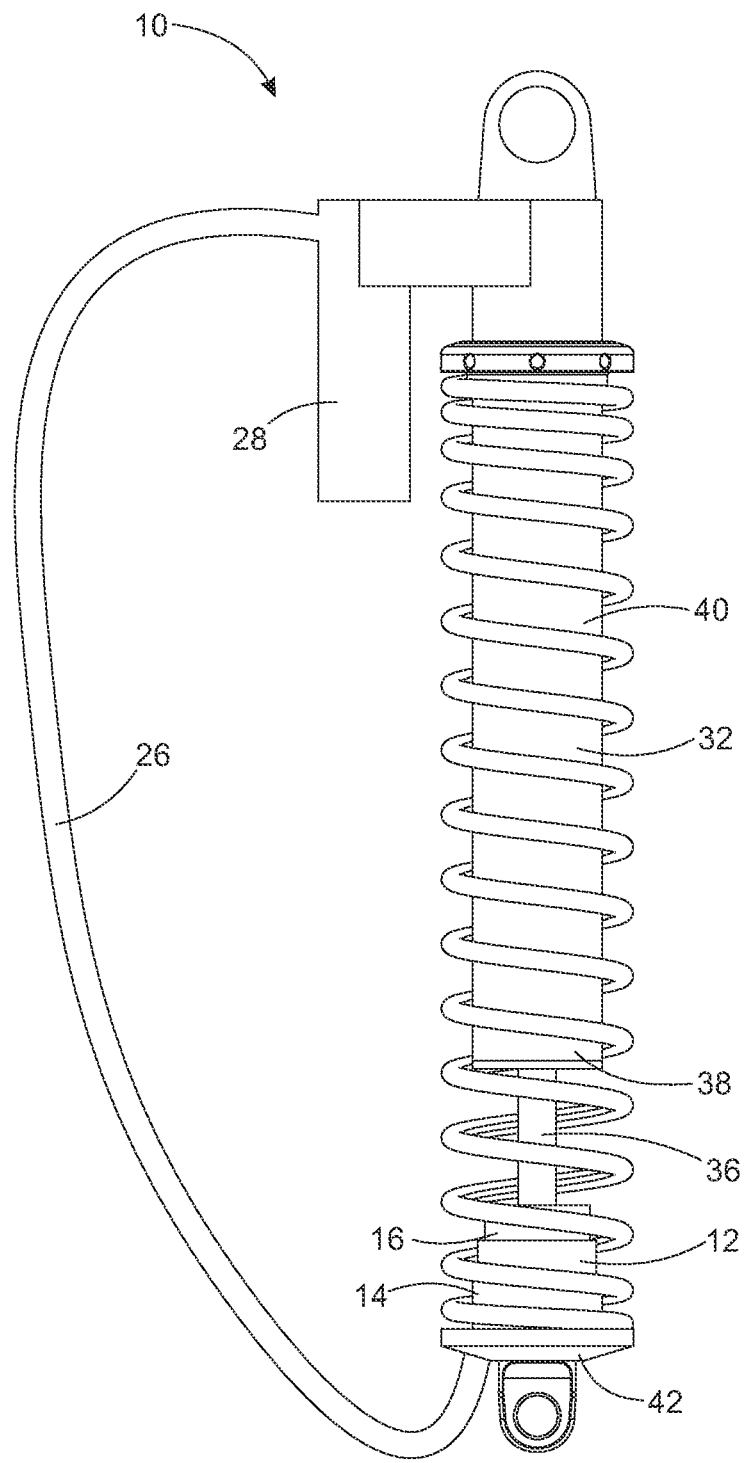
FIG. 3A is a front view of a shock absorber comprising a hydraulic bump stop assembly, according to an embodiment.
Figure 3B:
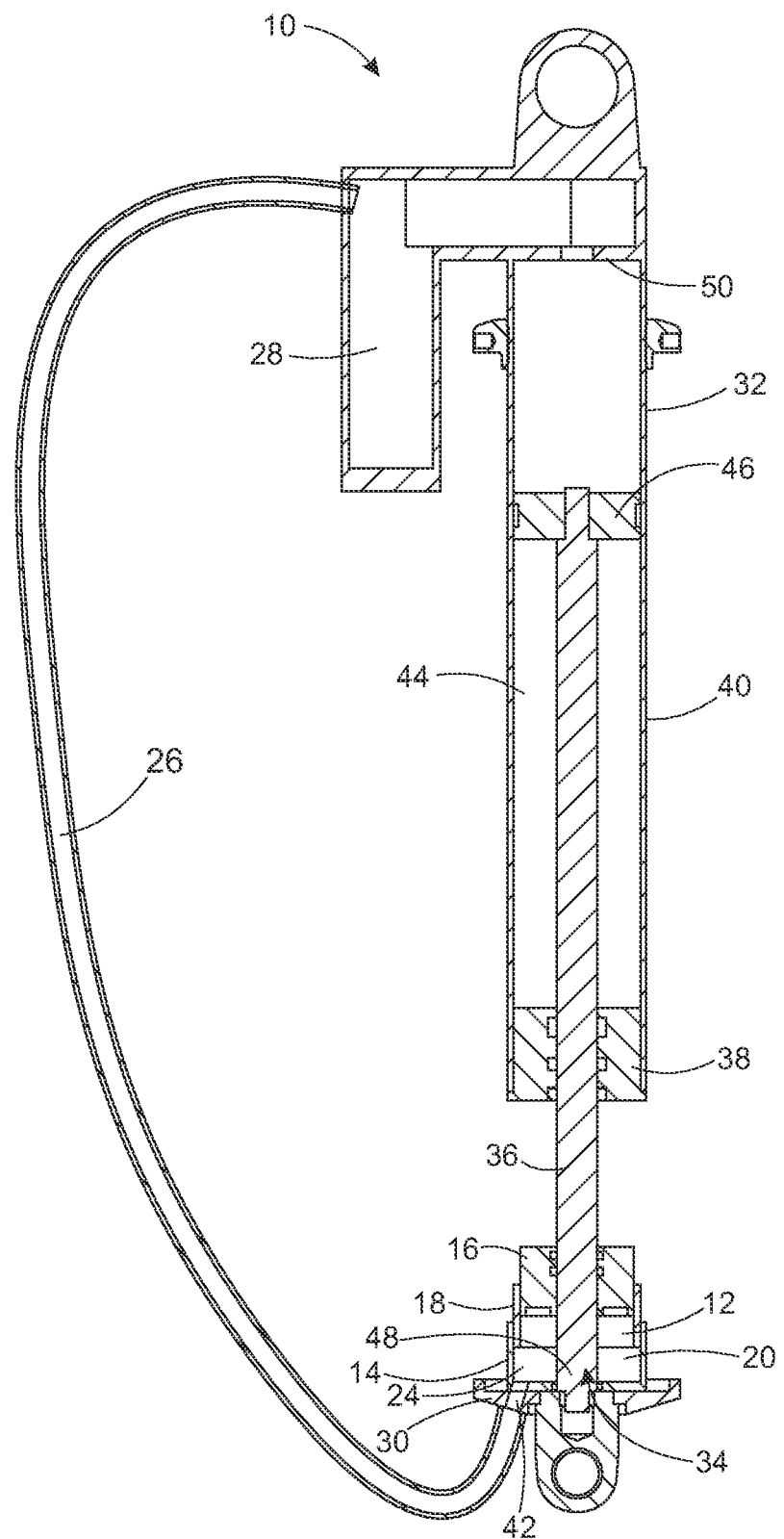
FIG. 3B is a front section view of a shock absorber comprising a hydraulic bump stop assembly, according to an embodiment.
Figure 3C:
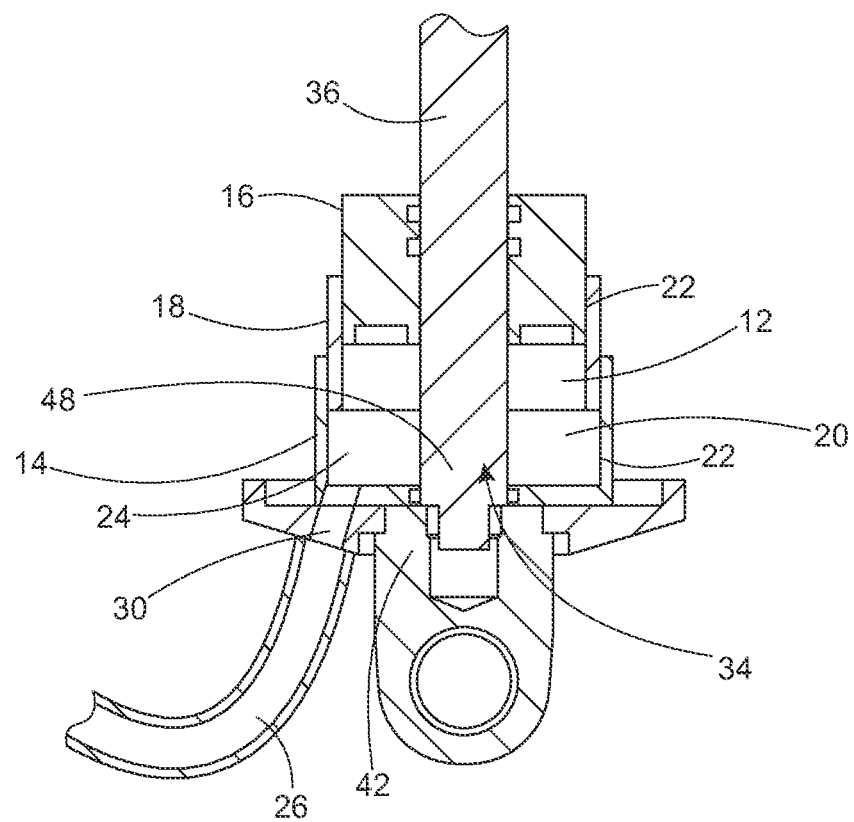
FIG. 3C is a close-up front section view of a hydraulic bump stop assembly, according to an embodiment.
Figure 3D:
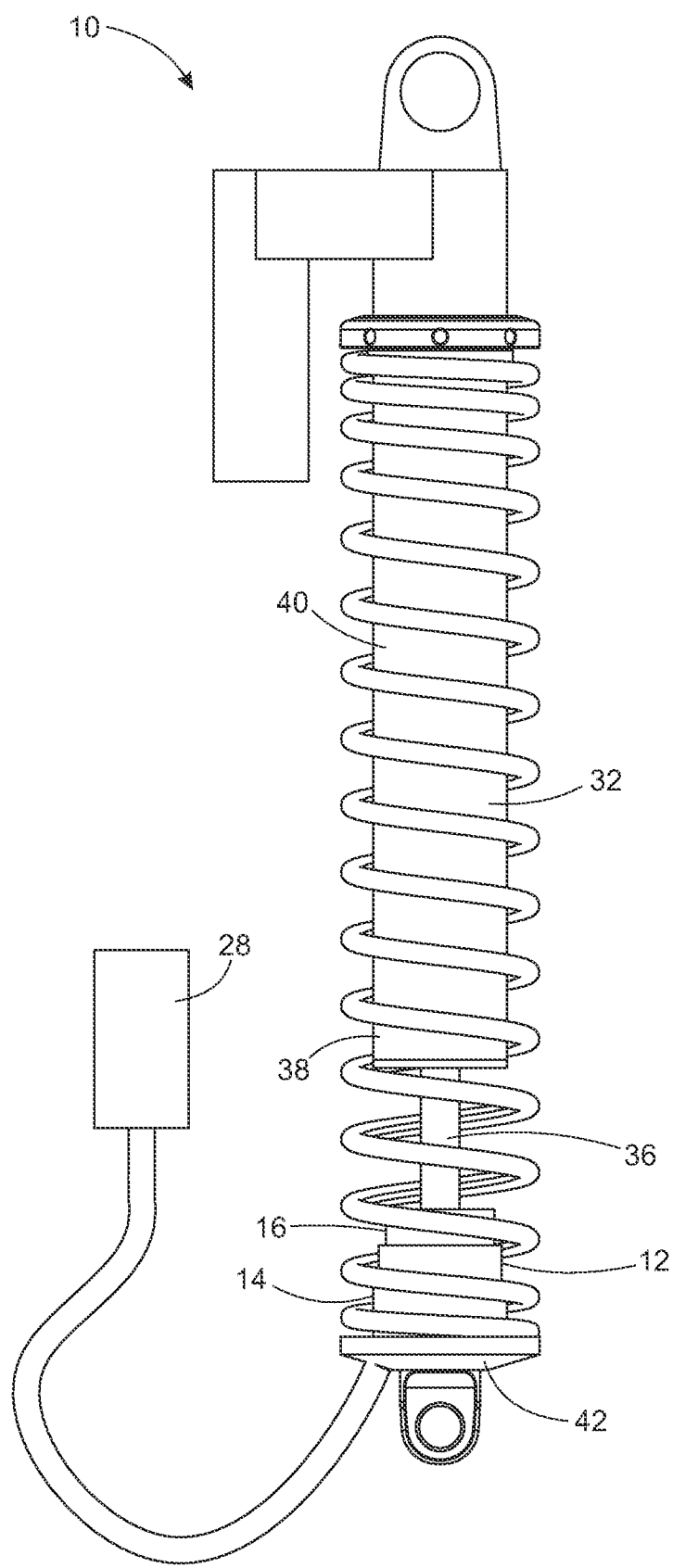
FIG. 3D is a front view of a shock absorber comprising a hydraulic bump stop assembly, according to an embodiment.
Figure 3E:
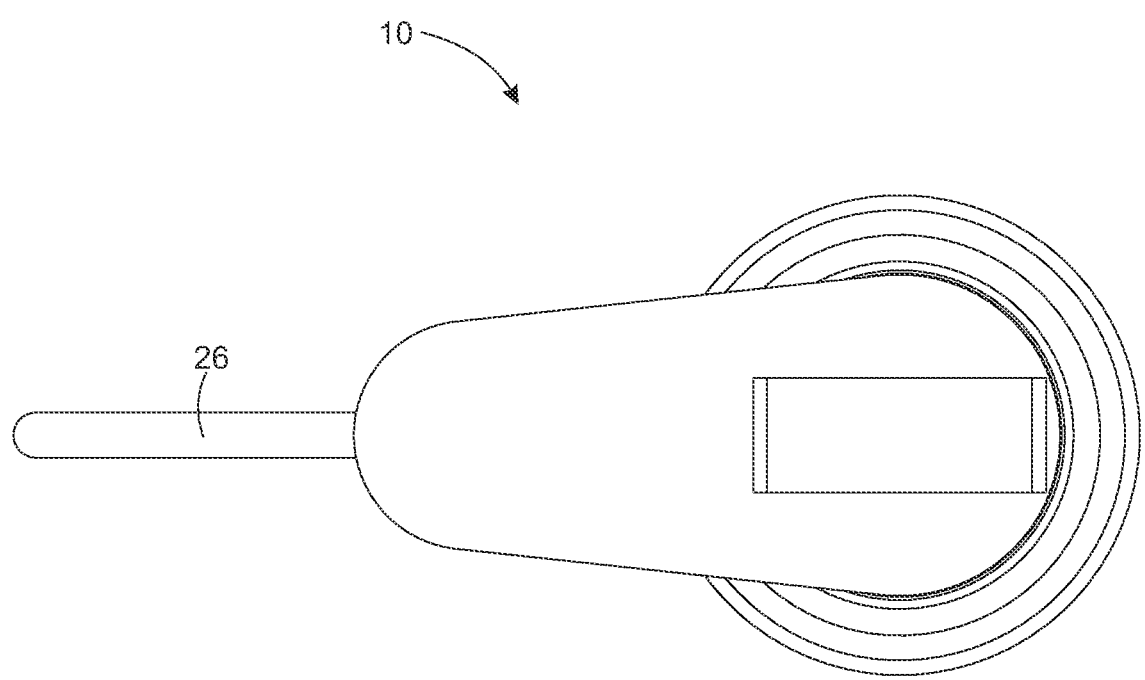
FIG. 3E is a top view of a hydraulic bump stop assembly, according to an embodiment.

In other embodiments, the telescoping hydraulic cylinder 12 may be disposed at a different location on the shock 32. For example, it may be disposed at the lower end 48 of the main rod 36, and coupled to the bottom perch 42, as shown in FIGS. 2A-C. In such embodiments, compression of the telescoping cylinder 12 begins when the bottom end 38 of the piston cylinder 40 of the shock 32 comes into contact with and engages the telescoping cylinder 12 during compression of the shock 32. In such embodiments, the at least one hydraulic fluid line 26 may be disposed internally to the main rod 36, wherein the at least one hydraulic fluid line 26 is in fluid communication with the telescoping hydraulic cylinder 12 at one end and that portion of the internal volume 44 of the piston cylinder 40 of the shock 32 above the piston 46 at the other end, wherein that portion of the internal volume 44 of the piston cylinder 40 of the shock 32 above the piston 46 is the reservoir 28. In some such embodiments, the at least one hydraulic fluid line 26 may be alternatively in fluid communication with the telescoping hydraulic cylinder 12 at one end and the reservoir of the shock 32 at the other end, as shown in FIGS. 3A-B, wherein the reservoir of the shock is the reservoir 28. In yet other embodiments, the at least one hydraulic fluid line 26 may be alternatively in fluid communication with the telescoping hydraulic cylinder 12 at one end and a separate reservoir at the other end, as shown in FIG. 3D, wherein the separate reservoir is the reservoir 28.

Figure 4A:
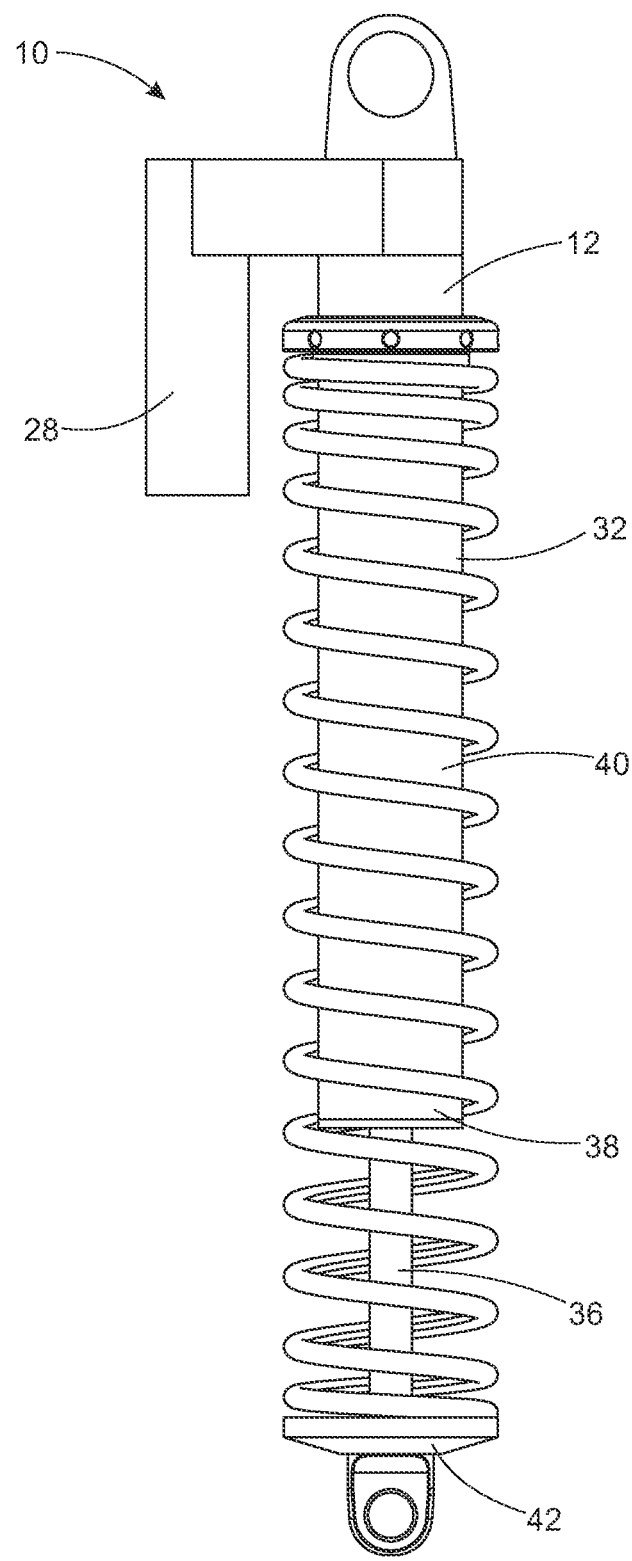
FIG. 4A is a front view of a shock absorber comprising a hydraulic bump stop assembly, according to an embodiment.
Figure 4B:
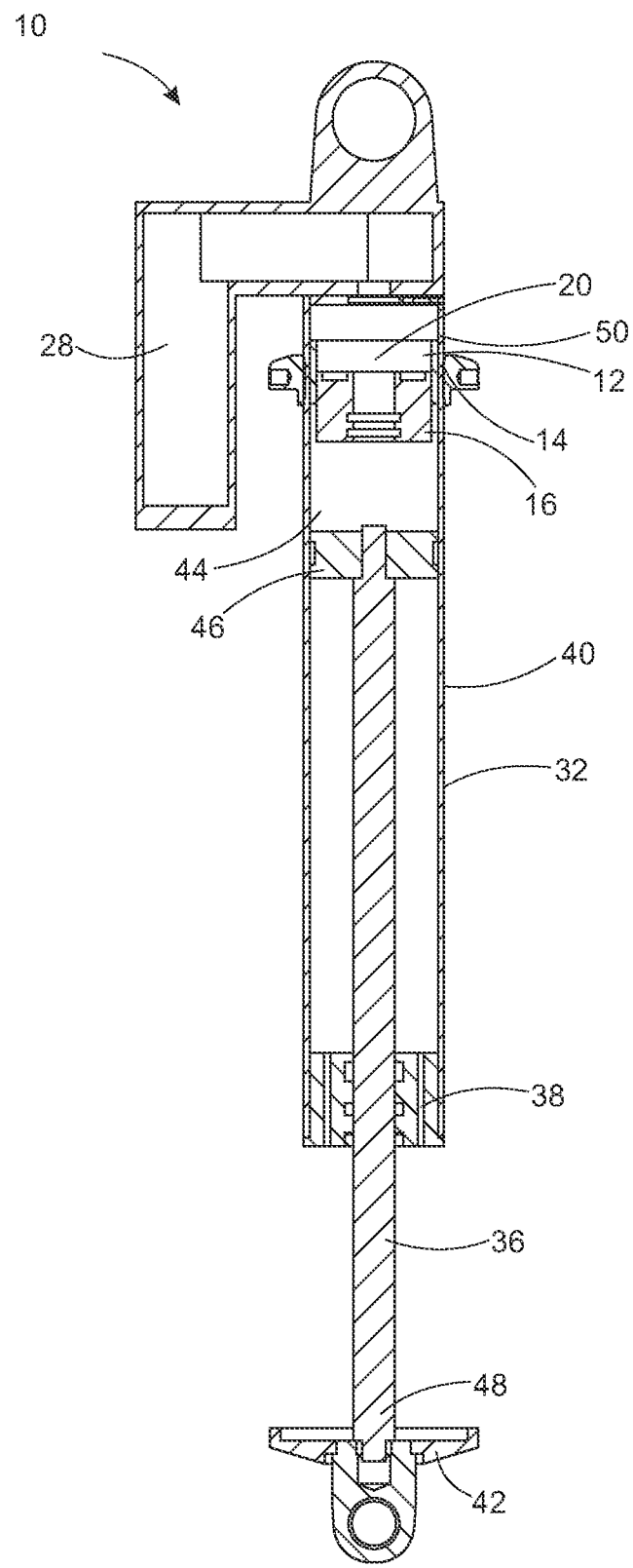
FIG. 4B is a front section view of a shock absorber comprising a hydraulic bump stop assembly, according to an embodiment.
Figure 4C:
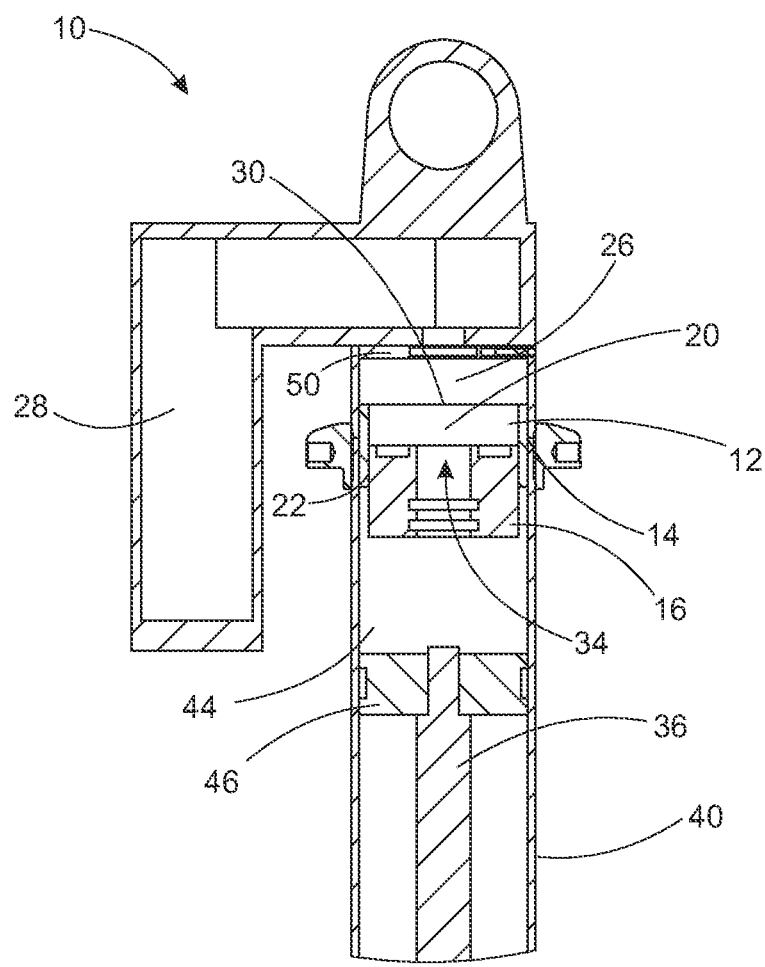
FIG. 4C is a close-up front section view of a hydraulic bump stop assembly, according to an embodiment.
Figure 4D:
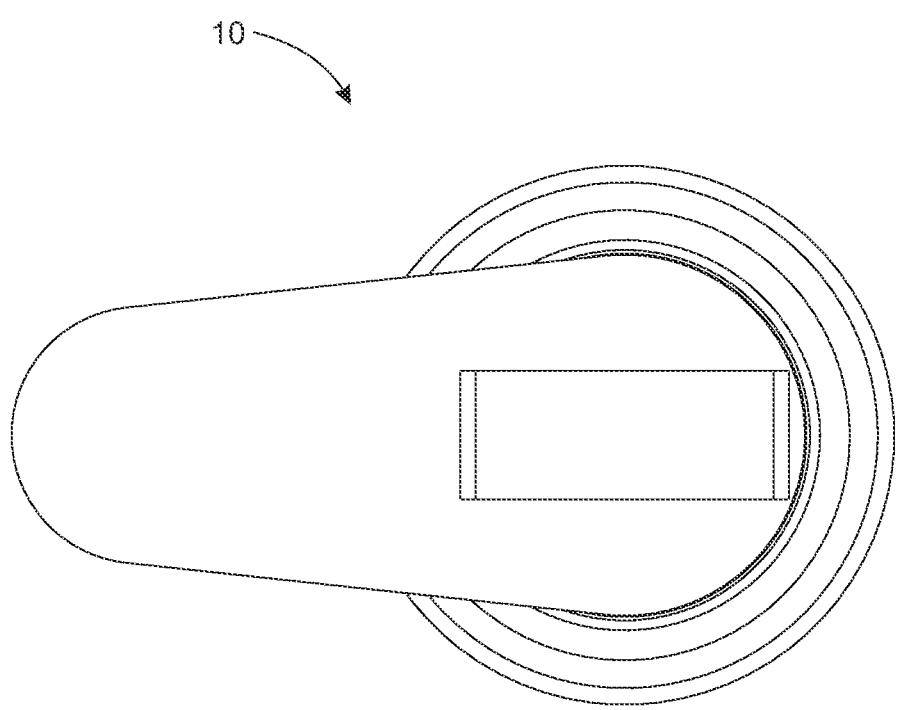
FIG. 4D is a top view of a hydraulic bump stop assembly, according to an embodiment.

In some embodiments, the telescoping hydraulic cylinder 12 may be disposed within the interior volume 44 of the piston cylinder 40 of the shock 32, above the piston 46, and may be coupled, for example, to the upper end 50 of the interior 44 of the piston cylinder 40, as shown in FIGS. 4A-C. In such embodiments, compression of the telescoping cylinder 12 begins when the piston 46 of the piston cylinder 40 of the shock 32 comes into contact with and engages the telescoping cylinder 12 during compression of the shock 32. In such embodiments, the at least one hydraulic fluid line 26 may be in fluid communication with the telescoping hydraulic cylinder 12 at one end and the reservoir 28 of the shock 32 at the other end, as shown in FIGS. 4B-C, wherein the reservoir of the shock is the reservoir 28.

Regardless of the particular configuration or disposition of the telescoping hydraulic cylinder 12 coupled to the shock 32, the damping ratios of the telescoping hydraulic cylinder 12 may be adjustable by interchanging the at least one orifice 30 between the telescoping hydraulic cylinder 12 and the at least one hydraulic fluid line 26, or by adjusting such at least one orifice 30 that may be adjustable. In some embodiments, adjustment of an at least one adjustable orifice 30 may be performed remotely, such as from a control disposed within the driver compartment of the vehicle (not shown). In some embodiments, the means of adjustment of the at least one adjustable orifice 30 may be through a mechanical linkage, or by wire, or wireless (not shown).

In some embodiments, a hydraulic bump stop assembly 10 may comprise a shock 32 with a telescoping hydraulic cylinder 12 coupled to the shock 32; and at least one hydraulic fluid line 26 coupled between the telescoping hydraulic cylinder 12 and a reservoir 28, wherein the particular embodiment of the telescoping hydraulic cylinder 12 and the at least one hydraulic fluid line 26 may be any of those embodiments described above that are configured to be coupled to a vehicle shock 32.

The components defining any hydraulic bump stop assembly may be formed of any of many different types of materials or combinations thereof that can readily be formed into shaped objects provided that the components selected are consistent with the intended operation of a hydraulic bump stop assembly. For example, the components may be formed of: rubbers (synthetic and/or natural) and/or other like materials; glasses (such as fiberglass), carbon-fiber, aramid-fiber, any combination thereof, and/or other like materials; polymers, such as thermoplastics (such as acrylonitrile butadiene styrene (ABS), fluoropolymers, polyacetal, polyamide; polycarbonate, polyethylene, polysulfone, and/or the like), thermosets (such as epoxy, phenolic resin, polyimide, polyurethane, silicone, and/or the like), any combination thereof, and/or other like materials; composites and/or other like materials; metals, such as copper, zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any hydraulic bump stop assembly may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, sewing, any combination thereof, and/or the like for example, depending on, among other considerations, the particular material forming the components. Other possible steps may include sand blasting, polishing, powder coating, zinc plating, anodizing, hard anodizing, and/or painting the components, for example.

The embodiments and examples set forth herein are presented in order to best explain illustrative embodiments and illustrative practical applications thereof, and to thereby enable those of ordinary skill in the art to make and use illustrative embodiments. However, those of ordinary skill in the art will recognize that the foregoing description and examples have been presented for the purposes of illustration and example only. The description as set forth is not intended to be exhaustive or to limit the invention to any of the particular forms, embodiments, materials, or steps disclosed above. Many modifications and variations are possible in light of the teachings above without departing from the spirit and scope of the forthcoming claims.

What is claimed is:

1. A hydraulic bump stop comprising:
   an outer hydraulic cylinder coupled to a bottom end of a hydraulic piston cylinder of a shock absorber;
   an inner hydraulic cylinder operationally coupled to, and coaxial with, the outer hydraulic cylinder, wherein the inner cylinder slidingly engages the outer cylinder, and wherein the outer hydraulic cylinder and the inner hydraulic cylinder define a telescoping cylinder interior volume, wherein an interior volume of the hydraulic piston cylinder of the shock absorber is in fluid communication with the telescoping cylinder interior volume through at least one orifice;
   further comprising a means of adjusting a cross-sectional area of the at least one orifice, thereby controlling a damping ratio of the hydraulic bump stop;
   further comprising a remote means of controlling the means of adjusting the cross-sectional area of the at least one orifice.

2. The hydraulic bump stop of claim 1, wherein the hydraulic bump stop is configured to be coupled to the shock absorber, which is coupled to a vehicle, and wherein the remote means is positioned in a driver compartment of the vehicle.

3. The hydraulic bump stop of claim 2, wherein the at least one orifice comprises at least one compression orifice and at least one expansion orifice, wherein the at least one compression orifice defines a compression damping ratio, and the at least one expansion orifice defines an expansion damping ratio.

* * * * *